United States Patent [19]

Zwayer et al.

[11] Patent Number: 5,775,613
[45] Date of Patent: Jul. 7, 1998

[54] ANTI-REVERSE SYSTEM FOR A FISHING REEL

[75] Inventors: Kent Zwayer; Dale Davis, both of Tulsa, Okla.

[73] Assignee: Zebco Division of Brunswick Corporation, Tulsa, Okla.

[21] Appl. No.: 613,679

[22] Filed: Mar. 11, 1996

[51] Int. Cl.$^6$ ................................................. A01K 89/02
[52] U.S. Cl. ............................................ 242/247; 242/300
[58] Field of Search ................................... 242/247, 248, 242/300

[56] References Cited

U.S. PATENT DOCUMENTS

| | | | |
|---|---|---|---|
| 4,546,932 | 10/1985 | Ohmori | 242/300 |
| 4,614,314 | 9/1986 | Ban | 242/300 X |
| 4,650,134 | 3/1987 | Councilman | 242/300 X |
| 4,919,361 | 4/1990 | Kobayashi | 242/300 |
| 5,443,219 | 8/1995 | Hashimoto | 242/247 X |

*Primary Examiner*—Donald P. Walsh
*Assistant Examiner*—Emmanuel M. Marcelo
*Attorney, Agent, or Firm*—Wood, Phillips, VanSanten, Clark & Mortimer

[57] ABSTRACT

A fishing reel having a line carrying spool and an operating mechanism for directing line onto the spool. The operating mechanism includes a first shaft that is rotatable about a first axis and a second shaft that is rotatable about a second axis that is transverse to the first axis. The first and second shafts are each rotatable in forward and reverse directions around the first and second axes. The operating mechanism further includes an anti-reverse system with a ratchet element on the second shaft, an actuator, and first structure cooperating between the first shaft and actuator for causing the actuator to follow movement of the first shaft between a) a first position resulting from the first shaft rotating in the reverse direction wherein the actuator does not interfere with rotation of the second shaft in the reverse direction and b) a second position resulting from the first shaft rotating in the reverse direction wherein the actuator cooperates with the ratchet to limit rotation of the second shaft in the reverse direction. The actuator is rotatable about the first axis between the first and second positions.

16 Claims, 3 Drawing Sheets

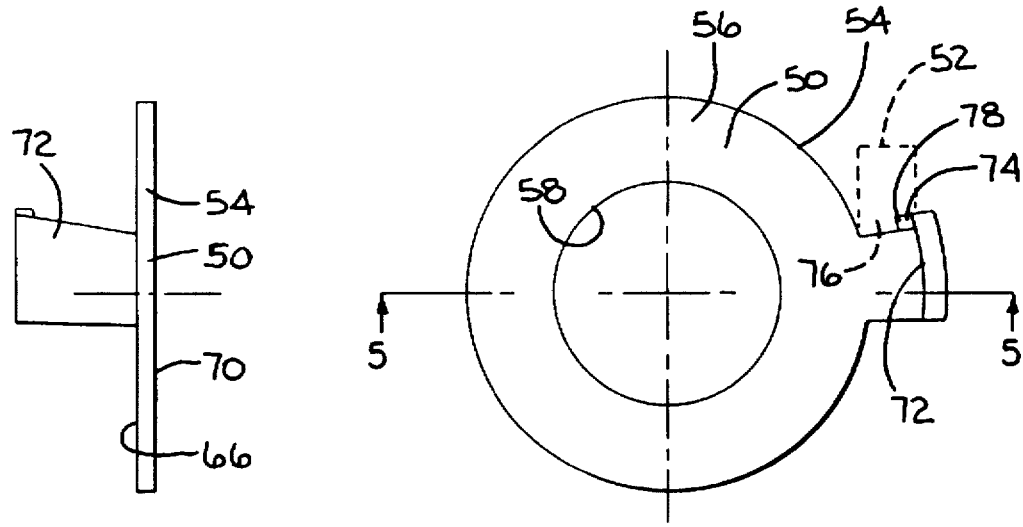
FIG. 6
FIG. 4
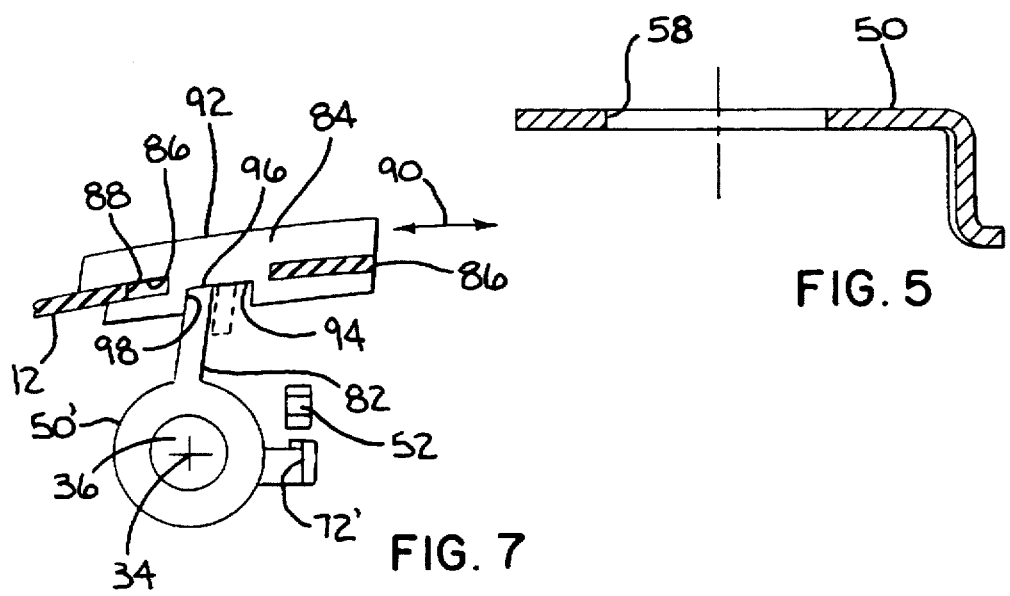
FIG. 5
FIG. 7

5,775,613

ANTI-REVERSE SYSTEM FOR A FISHING REEL

BACKGROUND OF THE INVENTION

1. Field of the Invention

This invention relates to fishing reels having a mechanism that is operable in a forward direction to direct line onto a line carrying spool and, more particularly, to a system for preventing reverse rotation of at least part of the mechanism as would allow line to pay out of the line carrying spool.

2. Background Art

Spincast style spinning reels, commonly referred to in the industry as closed face reels, have been exceptionally popular. In one typical construction, a line carrying spool is mounted at the front of the reel, with there being a forwardly situated spinner head that is rotatable about a fore and aft axis that is coincident with the spool axis. The spinner head has a pickup pin that draws line in a wrapping motion around the spool.

Rotation is imparted to the spinner head through a laterally extending crank shaft, driven by an external actuating handle. A face gear on the crank shaft is in mesh with a pinion gear on a center shaft carrying the spinner head.

It is often desirable to have a selective, or full time, anti-reverse system in such a reel to prevent reverse rotation of the spinner head and crank shaft as would allow line to pay off of the spool. The assignee herein owns numerous patents on different types of anti-reverse systems.

An exemplary system is shown in U.S. Pat. No. 4,492,347, to Moss. The Moss structure has proven to be highly commercially successful. In that system, a ratchet is provided on the laterally extending crank shaft. A pawl actuator slippingly, frictionally grips the crank shaft. The actuator has a tab which tips a pivotable pawl between engaged and disengaged positions in response to rotation of the crank shaft. In the engaged position, a part of the pawl moves between adjacent teeth on the ratchet to limit rearward rotation of the crank shaft.

One drawback with this type of system relates not to its operating capabilities, but rather to its assembly requirements. The pawl and actuator are relatively small parts which must be assembled in a precise manner. Hand assembly of these parts is a relatively delicate procedure, requiring a significant amount of dexterity.

Another exemplary anti-reverse system is shown in U.S. Pat. No. 4,463,916, to Puryear. The Puryear anti-reverse system also has multiple parts, with the attendant drawbacks discussed above.

SUMMARY OF THE INVENTION

In one form of the invention, a fishing reel is provided having a line carrying spool and an operating mechanism for directing line onto the spool. The operating mechanism includes a first shaft that is rotatable about a first axis and a second shaft that is rotatable about a second axis that is transverse to the first axis. The first and second shafts are each rotatable in forward and reverse directions around the first and second axes. The operating mechanism further includes an anti-reverse system with a ratchet element on the second shaft, an actuator, and first structure cooperating between the first shaft and actuator for causing the actuator to follow movement of the first shaft between a) a first position resulting from the first shaft rotating in the reverse direction wherein the actuator does not interfere with rotation of the second shaft in the reverse direction and b) a second position resulting from the first shaft rotating in the reverse direction wherein the actuator cooperates with the ratchet to limit rotation of the second shaft in the reverse direction. The actuator is rotatable about the first axis between the first and second positions.

In one form, the actuator has an annular body with an offset arm that engages the ratchet with the actuator in the second position. The actuator body may extend continuously around the first axis.

In one form, the annular body has oppositely facing first and second flat surfaces and the offset arm projects angularly away from the first and second flat surfaces.

The actuator can be formed from a single piece of formed metal.

In one form, the operating mechanism includes a drive gear on the first shaft, the first structure includes a first surface on the actuator facing axially with respect to the first axis and a second surface on the drive gear facing axially with respect to the first axis, and the first and second surfaces slippingly, frictionally grip each other to cause the actuator to follow movement of the drive gear and thus the first shaft.

The first structure may include a film of grease placed between the first and second surfaces to transmit a rotative force between the surfaces.

The operating mechanism may include a rotatable element that engages line and wraps line around the line carrying spool as the rotatable element rotates. A driven gear can be provided on the second shaft, with the ratchet located between the driven gear and the rotatable element.

In one form, the drive gear is a face gear having teeth projecting in one axial direction relative to the first axis and the second surface faces oppositely to the one axial direction.

In one form, the reel has a frame upon which the operating mechanism is mounted and there is second structure cooperating between the actuator and frame for releasably locking the actuator in the first position.

The second structure may include an actuator exposed at an exterior location on the frame of the fishing reel.

The second structure may further include a second offset arm on the actuator.

In another form of the invention, a fishing reel is provided including a line carrying spool and an operating mechanism for directing line onto the spool. The operating mechanism includes an external actuating element for the operating mechanism, a rotatable element that engages line and rotates to direct line onto the line carrying spool as the external actuating element is operated, and a drive train with first and second relatively movable drive train elements that are operable selectively in a forward direction, to transmit a drive force from the external actuating element to the first rotatable element to thereby cause rotation of the first rotatable element in a first rotational direction so as to direct line onto the spool, and a reverse direction. The operating mechanism includes an anti-reverse system with a one piece actuator that is movable between first and second positions. The antireverse system further includes structure cooperating directly between the actuator and the second drive train element for causing the actuator to limit rotation of the first rotatable element in a direction opposite to the first rotational direction with the actuator in the second position. The anti-reverse system further includes second structure cooperating directly between the first drive train element and the actuator for selectively a) placing the actuator in the first position as an incident of the first drive train element moving in a forward direction to cause the first rotatable element to rotate in the first rotational direction, and b) placing the actuator in the second position as an incident of the first drive train element moving in the reverse direction.

BRIEF DESCRIPTION OF THE DRAWINGS

FIG. 4 is an enlarged, side elevation view of an actuator that is a part of the inventive anti-reverse system in relation to a cooperating ratchet element and in an "on" position;

FIG. 5 is a cross-sectional view of the actuator taken along line 5—5 of FIG. 4;

FIG. 6 is an enlarged, front elevation view of the actuator in FIGS. 4 and 5; and FIG. 7 is a fragmentary, side elevation view of a modified form of anti-reverse system, according to the present invention, incorporating a manual on/off override switch for the anti-reverse system and with the actuator in an "off" position.

DETAILED DESCRIPTION OF THE DRAWINGS

Figure 1:
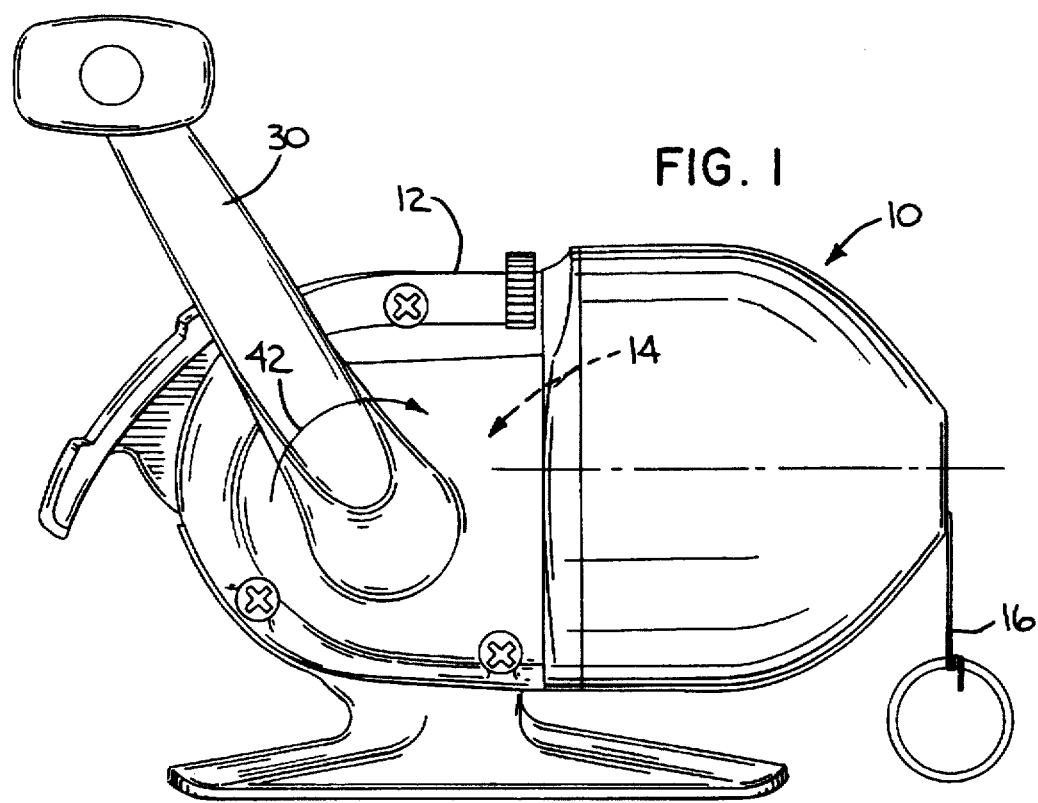
FIG. 1 is a side elevation view of a fishing reel incorporating an anti-reverse system according to the present invention.
Figure 2:
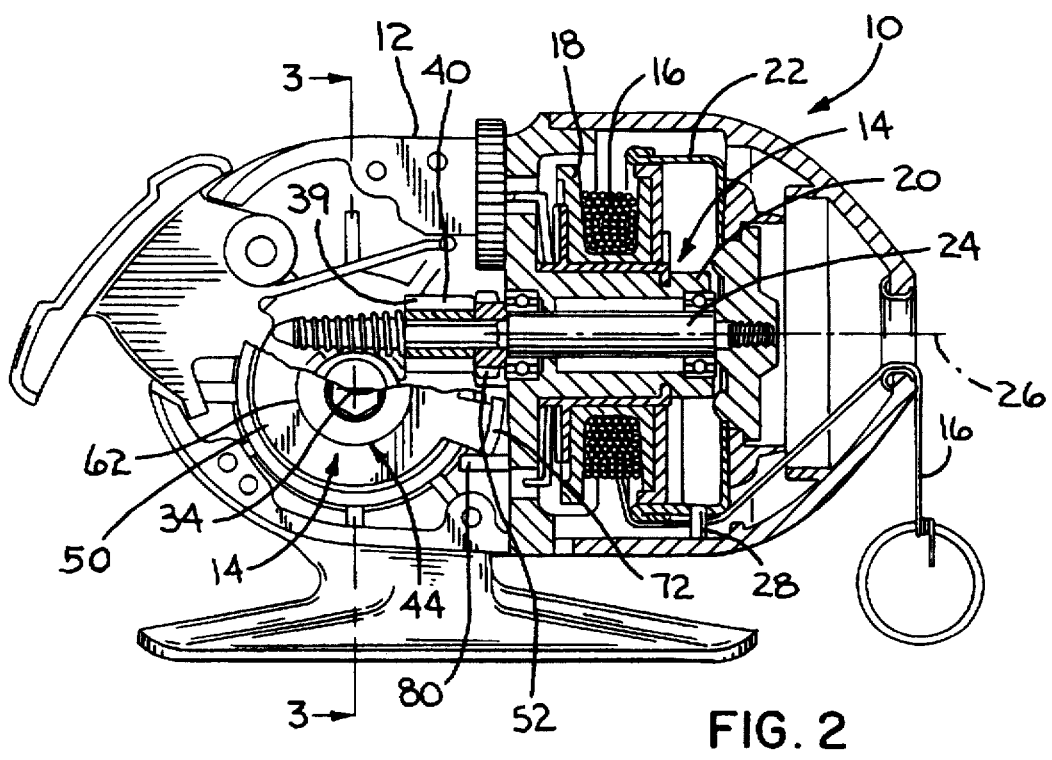
FIG. 2 is a vertical cross-sectional view of the reel in FIG. 1.
Figure 3:
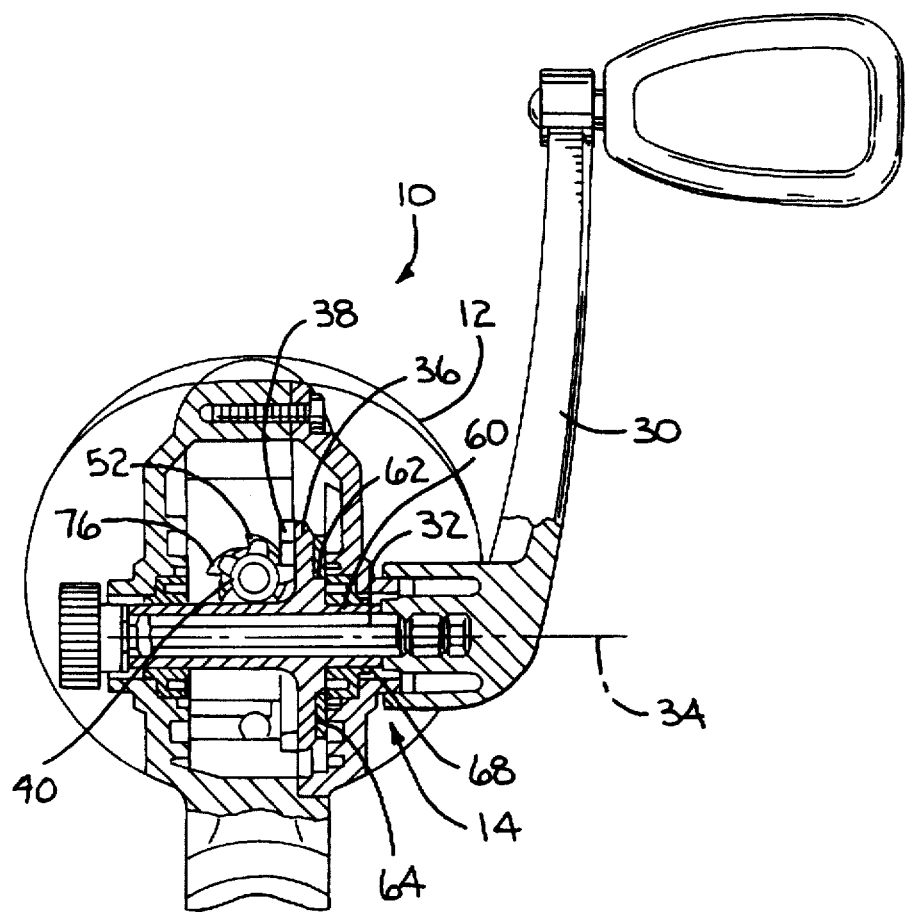
FIG. 3 is a cross-sectional view of the reel taken along line 3—3 of FIG. 2.

In FIGS. 1–3, a spincast-style fishing reel incorporating the present invention, is shown at 10. The fishing reel 10 has a frame 12 supporting and surrounding part of an operating mechanism 14. The operating mechanism 14 is operable to allow fishing line 16 to be paid off of and retrieved onto a line carrying spool 18. The spool 18 is supported upon a deck plate 20 that is part of the frame 12.

A cup-shaped spinner head 22 is mounted to a center shaft 24 that is rotatable about a fore and aft axis 26. As the spinner head 22 rotates, a pickup pin 28 thereon engages and wraps line around the spool 18.

Rotation is imparted to the spinner head 22 through an external actuating element/crank handle 30 that is keyed to a laterally extending crank shaft 32 that is rotatable about an axis 34. The shafts 24, 32 together define a drive train for converting rotational movement of the crank handle 30 around the axis 34 to rotational movement of the spinner head 22 about the axis 26.

More particularly, the crank shaft 32 carries a drive gear 36, in the form of a face gear, with an annular arrangement of teeth 38 projecting axially inwardly. The teeth 38 are in mesh with teeth 39 on a pinion gear 40 keyed to the center shaft 24. Rotation of the crank handle 30 in a forward direction, in the direction of the arrow 42 in FIG. 1, effects forward rotation of the crank shaft 32, which is converted to forward rotation of the center shaft 24 so as to drive the spinner head 22, causing the pickup pin 28 thereon to engage the line 16 and wrap the line 16 around the spool 18.

The present invention is directed principally to an anti-reverse system at 44 that is part of the operating mechanism 14. The anti-reverse system 44 is designed to limit reverse rotation of the crank handle 30, i.e. opposite to the direction indicated by the arrow 42, and rotation of the center shaft 24 and spinner head 22 in a reverse direction as would allow line to pay off of the spool 18.

The anti-reverse system 44, as shown in detail in FIGS. 1–6, includes an actuator 50 that cooperates with a ratchet element 52 keyed to the center shaft 24 to follow rotation thereof around the axis 26. The actuator 50 has a body 54 with a flat portion 56 that extends continuously around an opening 58 that accommodates 15 the crank shaft 32.

More particularly, the drive gear 36, that is part of the crank shaft 32, has a stepped periphery 60 with an undercut surface 62 defining an annular seat that is slightly smaller than the diameter of the opening 58 to allow the actuator 50 to rotate smoothly, and guidingly relative to the drive gear 36/crank shaft 32 around the crank shaft axis 34. The drive gear 36 has a laterally outwardly facing, flat surface 64 which facially abuts to a flat, inwardly facing surface 66 on the actuator body 54. A retaining element 68 on the drive gear 36/crank shaft 32 confronts the oppositely facing flat surface 70 of the body 54 to captively maintain the actuator 50 in the operative position of FIGS. 2 and 3.

A film of grease is interposed between the actuator surface 66 and the drive gear surface 64. This arrangement causes the drive gear 36/crank shaft 32 to slippingly, frictionally drive the actuator 50 around the axis 34.

The actuator 50 has an offset arm 72 that projects angularly away from the flat surfaces 66, 70 on the body 54. The arm 72 terminates at a projection 74 which is configured to move between adjacent teeth 76 on the ratchet element 52 with the anti-reverse system in an "on" position.

In operation, if a force is exerted on the line 16 with the reel in its normal retrieve state, a reverse rotation is imparted to the spinner head 22 and center shaft 24. This in turn imparts a reverse rotative force to the drive gear 36. As the drive gear 36 reversely rotates, the surface 64 thereon, through the film of grease, causes the actuator 50 to follow movement thereof around the axis 34 to thereby cause the projection 74 to seat between adjacent teeth 76 on the ratchet element 52. Reverse rotation of the center shaft 24 is thereby limited. The blocking tooth 76 acts against a laterally facing surface 78 on the projection 74. With the actuator 50 locked in this "on" position, a solid resistance to rotation of the center shaft 24 is afforded.

The rotation limiting force is applied on the drive train between the pinion gear 40 and the spinner head 22 so that there is no significant shock force applied between the meshing gears 36, 40 as reverse rotation of the drive train is arrested.

By then rotating the crank handle 30 in a forward direction, the actuator 50, through frictional forces, is caused to follow movement of the drive gear 36. The actuator 50 moves until it encounters a locking tab 80 on the frame 12, as shown in FIG. 2, wherein the anti-reverse system 44 is in its "of" position. As the crank handle 30 continues to operate in the forward direction, the actuator 50 slips with little impedance relative to the drive gear 36.

With the inventive structure, the actuator 50 can be formed from a single piece of material, such as stainless steel. The actuator 50 acts directly between the drive gear 36/crank shaft 32 and the ratchet element 52 on the center shaft 24. As a result, few pieces are required in the actuating system 44, facilitating its construction and minimizing the likelihood of failure.

While the function of the anti-reverse system 44 has been described in response to force being applied to the line 16, the anti-reverse system 44 will automatically change from its "off" position to its "on" position by reversely rotating the crank handle 30. As this occurs, the actuator 50 follows movement of the crank shaft 32/drive gear 36 to situate the projection 74 between the ratchet teeth 76.

The invention also contemplates that the anti-reverse system 44 can be selectively, manually disabled. To accomplish this, as shown in FIG. 7, a modified from of actuator 50' is shown. This actuator 50' is the same as the actuator 50 in all respects with the exception of the provision of a second offset arm 82 that is circumferentially spaced from an arm 72', that is identical in construction and corresponds to the arm 72 on the actuator 50. The arm 82 cooperates with a movable switch 84 on the frame 12. The switch 84 has a slot 86 therein which receives a wall 88 on the frame 12 in such a manner that the switch 84 can slide in fore and aft directions as indicated by the arrow 90. The switch 84 has an external actuating surface 92 which can be conveniently engaged by a user's finger to move the switch 84 forwardly and rearwardly as desired.

The switch 84 has a receptacle 94 which accepts the free end 96 of the offset arm 82. As the switch 84 is advanced in a forward direction, i.e. to the right in FIG. 7, one edge 98 bounding the receptacle abuts to the arm free end 96 and causes the actuator 50' to rotate in a clockwise direction in FIG. 7 about the axis 34, thereby disengaging the offset arm 72' from the ratchet element 52. The frictional forces between the switch 84 and frame 12 are greater than is the frictional holding force between the actuator 50' and the drive gear 36 so that the switch 84 in the FIG. 7 position maintains the anti-reverse system in its "off" position. By shifting the switch 84 to the left in FIG. 7 i.e. rearwardly, so that the arm 82 resides in the phantom position in Fig. 7, the actuator 50' is allowed to pivot through its full range, corresponding to that previously described for the actuator 50.

The remainder of the reel operation, i.e. that part of the operating mechanism 14 that is responsible for changing the reel 10 back and forth between cast and retrieve states, applying a variable drag, etc., is peripheral to the present invention. Suitable structure for accomplishing this is shown in U.S. Pat. No. 4,695,009, to Swisher, the disclosure of which is incorporated herein by reference.

The foregoing disclosure of specific embodiments is intended to be illustrative of the broad concepts comprehended by the invention.

We claim:

1. A fishing reel comprising:

a line carrying spool; and an operating mechanism for directing line onto the spool, said operating mechanism including a first shaft that is rotatable about a first axis and a second shaft that is rotatable about a second axis that is transverse to the first axis, said first and second shafts each being rotatable in forward and reverse directions around the first and second axes, said operating mechanism including an anti-reverse system with a ratchet element on the second shaft, an actuator, and first means cooperating between the first shaft and actuator for causing the actuator to follow movement of the first shaft between a) a first position resulting from the first shaft rotating in the forward direction wherein the actuator does not interfere with rotation of the second shaft in the reverse direction and b) a second position resulting from the first shaft rotating in the reverse direction wherein the actuator cooperates with the ratchet to limit rotation of the second shaft in the reverse direction, said actuator being rotatable about the first axis between the first and second positions, said first means comprising a first surface on the actuator facing axially with respect to the first axis and a second surface on the first shaft facing axially relative to the first axis towards the first surface, said first and second surfaces slippingly, frictionally gripping each other to cause the actuator to follow movement of the first shaft.

2. The fishing reel according to claim 1 wherein the actuator comprises an annular body with an offset am that engages the ratchet with the actuator in the second position.

3. The fishing reel according to claim 2 wherein the first surface is substantially flat and the offset arm projects angularly away from the first surface.

4. The fishing reel according to claim 3 wherein the actuator is formed from a single piece of formed metal.

5. The fishing reel according to claim 1 wherein the operating mechanism includes a drive gear on the first shaft and the second surface is on the drive gear.

6. The fishing reel according to claim 5 wherein the first means comprises a film of grease between the first and second surfaces.

7. The fishing reel according to claim 5 wherein there is a rotatable element on the operating mechanism that engages line and wraps the line around the line carrying spool as the rotatable element rotates, there is a driven gear on the second shaft and the ratchet is located between the driven gear and the rotatable element.

8. The fishing reel according to claim 5 wherein the drive gear is a face gear having teeth projecting in one axial direction relative to the first axis and the second surface faces oppositely to the one axial direction.

9. The fishing reel according to claim 1 wherein the reel includes a frame upon which the operating mechanism is mounted and including second means for releasably locking the actuator in the first position.

10. The fishing reel according to claim 9 wherein the second means comprises an actuator exposed at an external location on the frame of the fishing reel.

11. The fishing reel according to claim 9 wherein the second means comprises a second offset arm on the actuator.

12. The fishing reel according to claim 1 wherein the actuator has a body that extends continuously around the first axis.

13. The fishing reel according to claim 1 wherein the first and second surfaces each extend continuously around the first axis.

14. The fishing reel according to claim 1 wherein a frictional gripping force produced between the first and second surfaces is the primary force that causes the actuator to follow movement of the first shaft.

15. A fishing reel comprising an operating mechanism for directing line onto the spool, said operating mechanism including an external actuating element for the operating mechanism, a first rotatable element that engages line and rotates to direct line onto the line carrying spool as the external actuating element is operated, and a drive train with first and second relatively movable drive train elements that are operable in a forward direction to transmit a drive force from the external actuating element to the first rotatable element to thereby cause rotation of the first rotatable element in a first rotational direction so as to direct line onto the spool and a reverse direction, said operating mechanism including an anti-reverse system comprising a one-piece actuator that is movable between first and second positions, said anti-reverse system further comprising first means cooperating directly between the actuator and the second drive train element for causing the actuator to limit rotation of the first rotatable element in a direction opposite to the first rotational direction with the actuator in the second position, said anti-reverse system further comprising second means cooperating directly between the first drive train element and actuator for selectively a) placing the actuator in the first position as an incident of the first drive train element moving in a forward direction to cause the first rotatable element to rotate in the first rotational direction and b) placing the actuator in the second position as an incident of the first drive train element moving in a reverse direction, said actuator in the first position allowing the first and second drive train elements to rotate in the reverse direction, wherein the first drive train element comprises a shaft with a drive gear thereon and the second means comprises means cooperating between the actuator and the drive gear, wherein the second means comprises a first surface on the actuator and a second surface on the drive gear and the first and second surfaces slippingly frictionally engage each other to cause the actuator to follow movement of the drive gear as the actuator moves between the first and second positions.

16. The fishing reel according to claim 15 wherein the first and second surfaces are flat and the second means comprises grease between the first and second surfaces.

* * * * *